United States Patent [19]
Brennan

[11] Patent Number: 4,937,901
[45] Date of Patent: Jul. 3, 1990

[54] APPARATUS FOR TURNING A PATIENT FROM A SUPINE TO A PRONE POSITION AND VICE-VERSA

[76] Inventor: Louis G. Brennan, 7333 Parkwoods Dr., Stockton, Calif. 95207

[21] Appl. No.: 267,544

[22] Filed: Nov. 4, 1988

[51] Int. Cl.[5] .................... A61C 7/10
[52] U.S. Cl. .................... 5/61; 5/81 R; 5/83; 5/85
[58] Field of Search .................... 5/61, 81 R, 83, 84, 5/86, 89

[56] References Cited

U.S. PATENT DOCUMENTS

| | | | |
|---|---|---|---|
| 429,716 | 6/1890 | Bishop . | |
| 552,672 | 1/1896 | Souney et al. . | |
| 885,329 | 4/1908 | Ellis | 5/86 |
| 1,644,043 | 10/1927 | Tiedeman . | |
| 1,667,982 | 5/1928 | Pearson . | |
| 1,698,754 | 1/1929 | Gadbois . | |
| 1,780,399 | 11/1930 | Munson . | |
| 1,990,357 | 2/1935 | Ward . | |
| 2,103,693 | 12/1937 | Pohl . | |
| 2,188,592 | 1/1940 | Cunningham . | |
| 2,239,821 | 4/1941 | Knox . | |
| 2,499,101 | 2/1950 | Kluglein . | |
| 2,534,471 | 12/1950 | Norheim . | |
| 2,613,371 | 10/1952 | Keyes, Jr. . | |
| 2,655,667 | 10/1953 | Burkert . | |
| 2,690,177 | 9/1954 | Hogan . | |
| 2,812,524 | 11/1957 | Pruitt . | |
| 3,034,152 | 5/1962 | Stryker . | |
| 3,049,726 | 8/1962 | Getz | 5/86 |
| 3,226,734 | 1/1966 | Coventon . | |
| 3,238,539 | 3/1966 | Koch . | |
| 3,302,218 | 2/1967 | Stryker . | |
| 3,302,219 | 2/1967 | Harris . | |
| 3,386,111 | 6/1968 | Daniel | 5/86 X |
| 3,526,908 | 10/1968 | Davis . | |
| 3,568,669 | 3/1971 | Stites . | |
| 3,827,089 | 8/1974 | Grow . | |
| 3,832,742 | 9/1974 | Stryker . | |
| 3,895,403 | 7/1975 | Davis . | |
| 3,924,281 | 12/1975 | Gibbs . | |
| 4,109,329 | 8/1978 | Tupper . | |
| 4,244,358 | 1/1981 | Pyers . | |
| 4,356,577 | 11/1982 | Taylor . | |

FOREIGN PATENT DOCUMENTS

| | | | |
|---|---|---|---|
| 359837 | 3/1962 | Switzerland | 5/61 |
| 685883 | 1/1953 | United Kingdom | 5/61 |

OTHER PUBLICATIONS

Amerilift Brochure, ©1983, American Medical Systems.

*Primary Examiner*—Michael F. Trettel
*Attorney, Agent, or Firm*—Knobbe, Martens, Olson & Bear

[57] ABSTRACT

An apparatus for turning a patient form a supine to a prone position and vice-versa during the course of a surgical procedure is disclosed. In one embodiment, the turning apparatus comprises a rotatable stretcher supported at opposite ends by a rectangular frame. The turning apparatus is adapted to straddle a standard operating table and is provided with telescoping members for adjusting the length and width of the apparatus to accommodate virtually any operating table. The hydraulic system of the operating table is used to raise the turning apparatus, which is then locked in place, either manually or by a self-locking mechanism, in an elevated position. The operating table is then lowered, and the stretcher portion rotated 180°, so as to turn the patient over. As a final step, the operating table is again raised to the level of the now rotated stretcher, the legs of the apparatus unlocked, and the patient lowered so that the surgical procedure can continue.

16 Claims, 2 Drawing Sheets

APPARATUS FOR TURNING A PATIENT FROM A SUPINE TO A PRONE POSITION AND VICE-VERSA

BACKGROUND OF THE INVENTION

The present invention relates generally to the field of turning frame assemblies, and more particularly to an apparatus for turning a patient from a supine (face up) to a prone (face down) position and vice-versa during a surgical procedure. Although the apparatus of the present invention may be adapted to a variety of applications, it is particularly useful prior to, during and/or following Liposuction surgery and other surgical procedures such as lumbar laminectomy and rectal surgery while the patient is in the operating room.

It is well known that it is often times necessary to be able to turn over patients confined to hospital beds so that they are shifted from a position wherein they are lying on their back to a position wherein they are lying on their stomach, and vice-versa. Invalids, or otherwise bedridden persons need to be turned from a face-up to a face-down position quite frequently so as to avoid serious discomfort resulting from lying in one position for a prolonged period of time. In addition, for patients in traction as a means of treatment and therapy for various conditions, it is often times desirable to turn the patient while maintaining traction so as to avoid pain and injury to the patient. To these ends, there have been a large number of turning devices heretofore developed.

U.S. Pat. Nos. 1,780,399 to Munson and 3,238,539 to Koch, for example, each describe a rotatable bed for an invalid in which the invalid is held fast between two mattresses which can be rotated together through 180° about a central longitudinal axis so as to turn the patient over. Invalid beds of this nature are often frightening to the patient and have a tendency to create a feeling of suffocation and claustrophobia. Further, these beds are not uncommonly cumbersome and often times require auxiliary equipment to effect turning of the patient. Similarly, prior art traction maintaining devices are, in general available for attachment to existing hospital beds and require special overbed support structures which may interfere with a surgeon's access to various parts of the patient's anatomy. Due to the size and bulkiness of these structures, rotatable invalid beds and traction maintaining turning frames are unsuitable for use in the operating room, where space is severely limited.

Considerable difficulty is frequently encountered in turning a patient over while on an operating table. In general, the surgical patient is under some form of anesthesia, which renders him/her unconscious. It is well known that a person in an unconscious state assumes "dead weight," which makes that person appear all the more heavier. Further, an unconscious person has no control over his/her appendages so that arms and legs have a tendency to fall off of the operating room table. To manually turn a conscious patient, the attendant or nurse must exert a great deal of strength which, can not only injure the patient, but also the attendant or nurse performing the turning procedure. To manually turn an unconscious patient is even more difficult due to the "dead weight" factor and uncontrollable appendages only add to the problems.

In addition to the many difficulties encountered in the manual turning of a patient, even greater obstacles are present when the patient is on an operating room table. Since the safety of the patient is of paramount importance, it is imperative that the turning of a patient, especially during a surgical procedure, does not interfere with the many life-support and life-monitoring systems which may be hooked up to the patient. In general, persons being operated upon have an intravenous solution running into one of the upper extremities. In addition, several electrodes are commonly attached at various locations about the patient's body for the monitoring of the patient's vital signs. Further, it is not uncommon to employ an endotracheal tube for the purposes of administering oxygen and/or an anesthetic of some sort.

Thus, while there are several variations of turning structures presently available, there is nothing in the prior art which provides for turning a patient from a supine to a prone position while in an operating room, on an operating room table. Accordingly, there is a need in the art for an apparatus capable of turning a patient from a supine to a prone position, or vice-versa which utilizes minimal space in the operating room, and allows easy access to all parts of the patient's body. Further, there is a need in the art for an apparatus capable of safely performing such a turning operation without interfering with life-support and life-monitoring devices which may be hooked up to the patient.

SUMMARY OF THE INVENTION

Briefly, the present invention is for a simple and economical structure for turning a patient from one side to the other side during a surgical procedure. The device is portable, and is adapted for use with existing hospital operating room tables. Preferably, the turning apparatus of the present invention comprises a rectangular frame of tubular construction, adapted to straddle virtually any ordinary operating room table. The frame includes a plurality of telescoping members which enable one to adjust the length and width of the device to accommodate a wide variety of operating room table shapes and sizes. The apparatus further includes a rotatable stretcher which is adapted to rest on the operating room table. The stretcher is centered within the rectangular frame and secured at opposite ends by a pair of spindles.

Preferably, the structural elements of the turning frame of the present invention are fabricated from metal tubes of either rectangular or circular cross-section, and these tubes are preferably fabricated from steel. Thus, the weight of the device is maintained at a minimum and is consistent with the strength and rigidity which are required of this type of structure. Further, while only a rectangular frame will be illustrated and described, it will be apparent to one of ordinary skill in the art that the frame may also take on other configurations. For example one end of the frame may be tapered, resulting in a coffin-shaped device, or both ends may be rounded to present an oval shape.

When it is desired to turn the patient over, the operating table is raised, thereby raising the turning apparatus and patient as well. Advantageously, the legs of the turning frame are also equipped with telescoping members so that they extend as the operating room table rises. The legs of the turning apparatus are then locked in place, either manually or by a self-locking mechanism, and the operating room table lowered, leaving the stretcher and patient in at an elevated level. The spindles, each of which are equipped with a turning crank are then rotated so as to turn the stretcher, and thus the patient over. Once the patient has been turned over, the operating room table is raised and the locking mechanisms on the legs of the frame are disengaged. The operating room table is then lowered, carrying with it the now-turned over patient. Significantly, since the turning apparatus of the present invention utilizes the hydraulic system of a standard operating table to raise and lower the patient prior to turning, no auxiliary motors or cumbersome equipment is required.

In an alternative embodiment, rather than having a rectangular frame structure to which the stretcher is secured, a pair of bookend-like stands are provided. These stands are adapted to be placed at opposite ends of the operating room table to receive and retain the stretcher therebetween. The stands utilize the hydraulic lifting system of the operating table in the same manner as the rectangular frame assembly. However, a considerably smaller amount of material is required to make the pair of stands as opposed to the rectangular frame, thus making a further economical savings.

Further objects, features and other advantages of the present invention will become apparent from the ensuing detailed description, considered together with the appended drawings.

DETAILED DESCRIPTION OF THE PREFERRED EMBODIMENT

Figure 1:
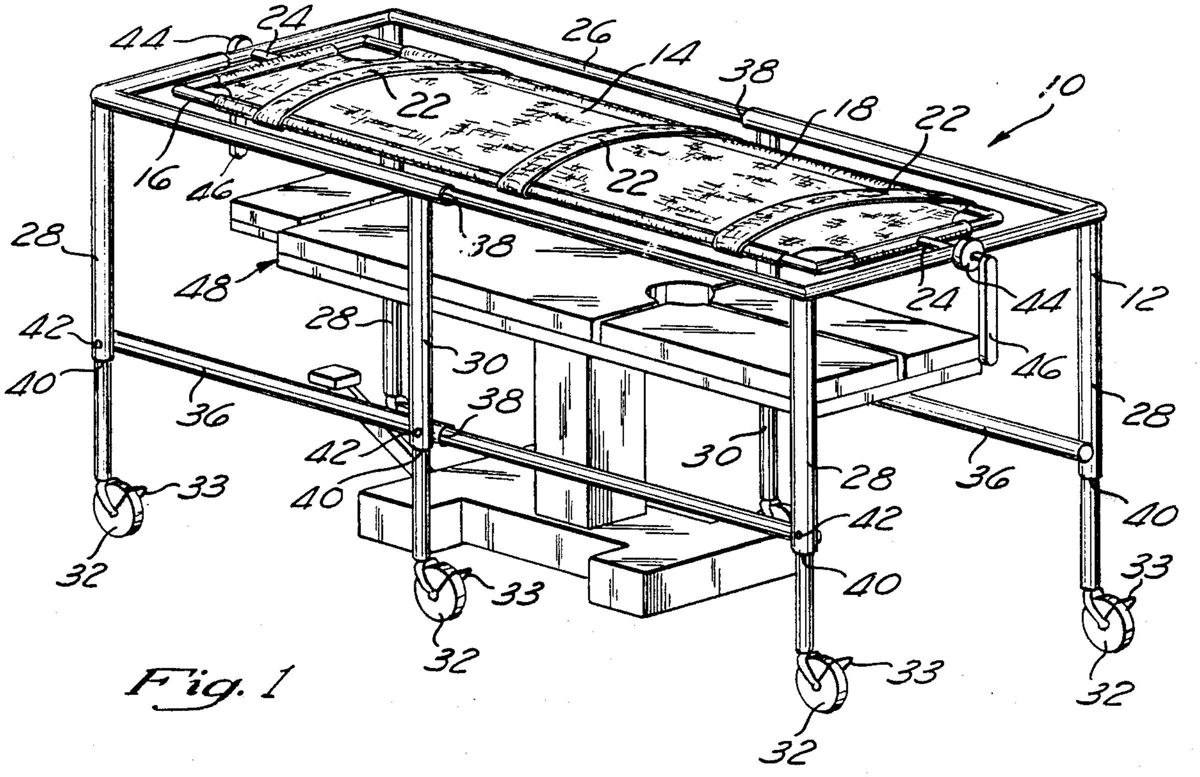
FIG. 1 is a perspective view of a turning apparatus consistent with a preferred embodiment of the present invention straddling a conventional operating table.

Referring now to the drawings in detail, wherein like reference numerals designate like elements throughout the several views thereof, there is shown generally at 10 a turning apparatus embodying the present, invention in a preferred form. As depicted in the drawings, the turning apparatus 10 comprises an outer frame 12 and a rotatable stretcher 14. Preferably, the stretcher 14 is of rectangular shape and tubular construction, with the outer frame 12 forming a concentric rectangle about the outer edges thereof. Alternatively, although not shown, the stretcher may take on any number of shapes, for example, coffin-shaped, so long as sufficient spacing exists between the stretcher 14 and outer frame 12 so as to allow unobstructed turning of the patient.

Figure 7:
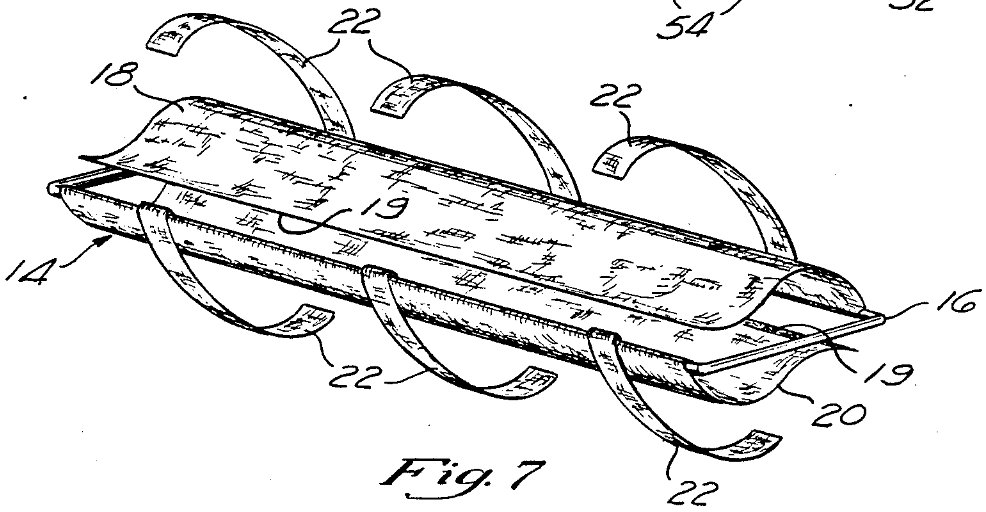
FIG. 7 is a perspective view of the rotatable stretcher portion of the turning apparatus of the present invention, showing the two sheets of fabric which encircle the patient during a turning procedure.

The rotatable stretcher 14 comprises a frame 16 having two sheets of canvas or other fabric 18, 20 (FIG. 7) stretched thereacross, forming a dorsal aspect and a ventral aspect for supporting the patient within the turning apparatus 10 during a turning procedure. One side of each of the two sheets 18, 20 is anchored and the other side removably attached to the frame 16 of the stretcher 14. This enables the physician to gain access to either aspect of the patient's anatomy, depending on whether the patient is lying in a supine or a prone position, as well as makes the device capable of accommodating patients of varying builds. The unanchored side of each sheet 18, 20 is provided with some form of engaging mechanism 19, such as hooks, buckles, VELCRO ® type hook and loop closures or the like, so as to secure the sheets in place prior to turning the patient. In addition to securing the sheets 18, 20 to the frame 16 by the engaging mechanism, a plurality of adjustable straps 22, removably secured on at least one side of the rotatable stretcher 14 are provided to encircle the patient and hold the patient fast to the stretcher 14 while the device 10 is being rotated. A pair of spindles 24 project from opposite ends of the stretcher 14 and provide a central axis about which the patient is to be turned. Advantageously, this axis coincides with the longitudinal axis of the patient.

To protect the patient's arms and other bodily parts, side cushions may be placed longitudinally along the patient's body. In addition, the sheets 18,20 are adapted to accommodate appropriate chest rolls and other buttressing devices (not shown). Such devices are commonly applied to the ventral aspect of the patient's anatomy to allow for appropriate excursion of the diaphragm and return of blood from the lower extremities and abdomen by relieving pressure off the abdomen and lower anterior chest wall while the patient is in a prone position.

The outer frame 12 comprises a upper rectangular portion 26, lying in a substantially horizontal plane and surrounding the rotatable stretcher 14. The upper rectangular portion 26 of the outer frame 12 is supported by a plurality of legs 28, disposed at the four corners of the structure. If desired, it is also contemplated to provide intermediate legs 30 for enhanced strength and support of the device. Preferably, each leg of the device is supported on casters 32 so as to make the apparatus 10 portable. Preferably, each caster 32 is provided with a locking mechanism 33 to ensure that the turning apparatus 10 remains in substantially the same location throughout the duration of the surgical procedure. A pair of support struts 36 are provided on opposite sides of the outer frame 12 intermediate the upper rectangular portion 26 and the casters 32. The upper rectangular portion 26 of the outer frame 12 is constructed of a plurality of telescoping members 38 which make the turning apparatus 10 adjustable in both length and width so as to enable the turning apparatus to be used in connection with virtually any size operating table.

In addition to being adjustable in both length and width to enable use with virtually any operating room table, the turning apparatus 10 of the present invention must also be adjustable in height to allow sufficient room for the rotation of the stretcher 14. Accordingly, the legs 28, 30 of the outer frame 12 are also equipped with telescoping members 40. The telescoping members 38, 40 each include a locking mechanism 42 for securing the rotatable stretcher 14 in an elevated position. The locking mechanism 42 can be manually operated, however, it is preferable to provide each leg 28, 30 with a self-locking mechanism as is well known and used in the art.

The rotatable stretcher 14 is secured to the outer frame 12 by the spindles 24. Preferably, the spindles 24 are fed through a hub 44 to which a crank 46 is attached. The crank 46 is adjusted so as to maintain the stretcher 14 in a substantially horizontal orientation unless the crank 46 is being turned so as to rotate the stretcher 14 and patient. While the crank 46 provides a convenient means for rotating the stretcher 14, it is possible to rotate the stretcher 14 in other ways. For example, the stretcher may be provided with a locking mechanism (not shown) for maintaining the stretcher in a particular orientation until the mechanism is disengaged. In this case, one may apply direct pressure to one side of the stretcher which runs longitudinally along the patient's body to effect turning, and then resecure the stretcher in place by reengaging the locking mechanism.

Advantageously, the turning apparatus 10 of the present invention utilizes the hydraulic, pneumatic and/or electric lift system of the operating table to do the majority of the work involved in turning a patient over. While a passive device is described and shown, it is also contemplated to provide a self-contained active system, fully equipped with its own lifting mechanisms.

Figure 2:
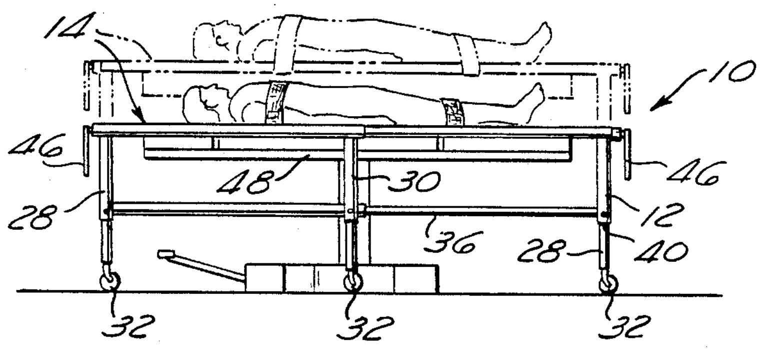
FIG. 2 is a side view of the turning apparatus illustrated in FIG. 1, showing, in phantom, the patient being lifted prior to being turned.

When it is desired to turn the patient from a supine to a prone position, for example, the patient is first positioned and secured between the sheets 18, 20 of the rotatable stretcher 14, which is then reinforced by means of the adjustable straps 22. As illustrated in FIG. 2, with the stretcher 14 lying on the operating table 48 and the locking mechanisms 42 on the legs 28, 30 of the frame 12 in a released portion, the operating table 48 is raised, carrying with it the stretcher 14. As the table 48 is raised, the telescoping members 40 of each leg extends.

Figure 3:
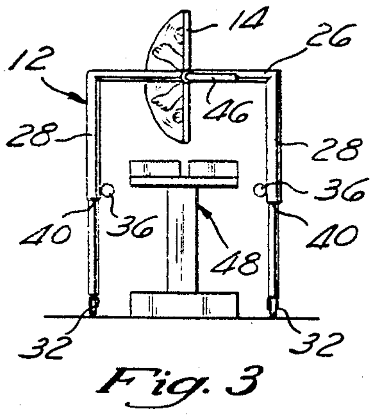
FIG. 3 is an end view of the turning apparatus, illustrating the rotation of the stretcher, and thus the turning of the patient.
Figure 4:
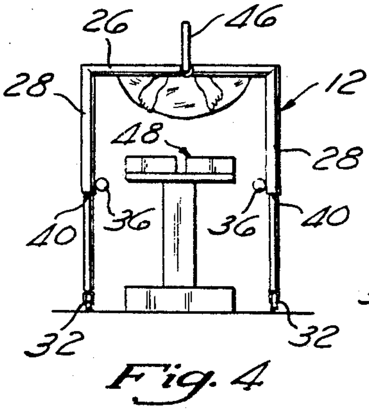
FIG. 4 is an end view of the turning apparatus, showing the patient turned to a prone position.
Figure 5:
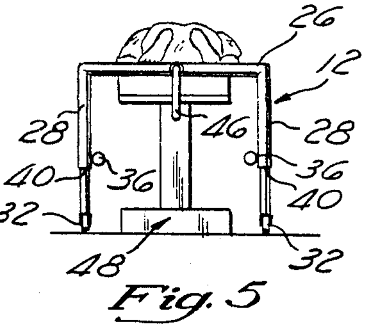
FIG. 5 is an end view of the turning apparatus depicting the patient in a prone position after being turned and lowered.

When a sufficient height has been reached, the legs 40 are locked in place, and the operating room table 48 lowered (see FIG. 3) to yield sufficient room to turn the patient over. Once the patient has been turned over, (see FIG.4), the operating room table 48 is again raised and the now-turned patient is lowered (FIG. 5). Advantageously, the turning apparatus 10 of the present invention enables one to use the desirable features of the operating room table, such as a rail for arm boards, I.V. holders, light attachments and the like while enhancing the surgical team's ability to turn the patient in a safe and virtually effortless manner.

Figure 6:
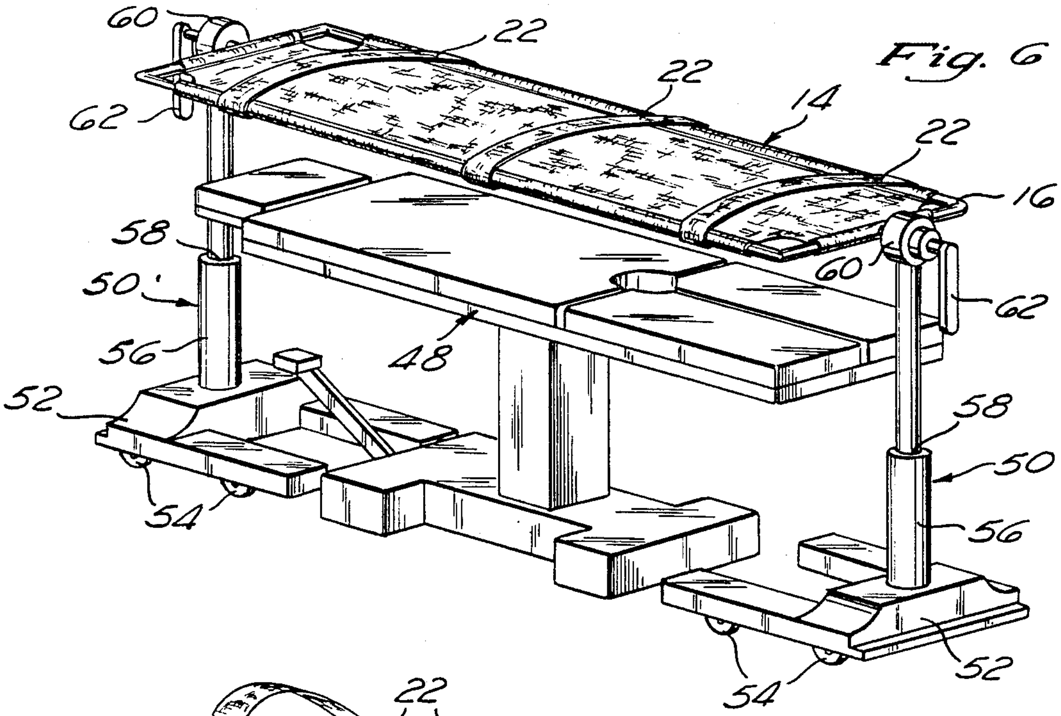
FIG. 6 is a perspective view of an alternative embodiment of the turning apparatus of the present invention.

In an alternative embodiment, as shown in FIG. 6, the outer frame 12 is replaced by a pair of L-shaped, bookend-like stands 50. Each stand 50 comprises a base portion 52, set on rollers 54, and an upwardly extending portion 56. The upwardly extending portion 56 comprises a telescoping member 58 for height adjustment and has a hub 60 and crank 62 disposed at the upper edge of upwardly extending portion 56 of the stands 50. The stands 50 are to be placed at opposite ends of the operating table 48. The rotatable stretcher 14 is mounted to the stands 50 through the hub portions 60 by the spindles 24. Once all of the pieces have been joined together, the stands 50 function in the same manner as that of the rectangular frame 12.

It is obvious that several modifications of the apparatus for carrying out the invention may be employed. For example, the supporting member for the body may be a conventional bed with straps or other means for retaining and supporting the person while being inverted.

What is claimed is:

1. A turning apparatus for turning a patient from a supine to a prone position and vice versa with minimal effort exerted by the person performing the turning and minimal risk of injury to the patient, said apparatus employing the lift system of a standard operating room table or other patient supporting device having its own inherent lift system to raise and lower said apparatus prior to and after turning the patient, said apparatus comprising:

a rotatable stretcher for supporting the patient's body during a 180° rotation, said rotatable stretcher having spindles extending from opposite ends thereof;

a stretcher support for rotatably mounting said spindles, said support straddling said operating room table or other patient supporting device having its own inherent lift system, and being movable upwardly to an elevated position as said operating room table or other patient supporting device having its own inherent lift system is raised; and means for turning said stretcher 180° while in said elevated position, so as to turn the patient from a supine to a prone position or vice versa.

2. A turning apparatus for turning a patient from a supine to a prone position and vice versa with minimal effort exerted by the person performing the turning and minimal risk of injury to the patient while allowing easy access and ample room for a medical team, said apparatus employing the lift system of a standard operating room table or other patient supporting device having its own inherent lift system to raise and lower said apparatus prior to and after turning the patient, said apparatus comprising:

a rotatable stretcher for supporting the patient's body during a 180° rotation;

a stretcher support for rotatably mounting said stretcher over said operating room table or other patient supporting device, said support being adjustable in height as said operating room table or other patient supporting device having its own inherent lift system is raised and lowered;

a lock for locking said support at an elevated height; and an apparatus attached to said stretcher for rotating said stretcher and patient 180° while said support is locked at said elevated height.

3. A turning apparatus as defined by claim 2, wherein said rotatable stretcher comprises:

a rectangular frame of tubular construction;

at least one piece of fabric stretched over said frame so as to form a surface on which the patient may lie; and means for securing said patient to said rotatable stretcher.

4. A turning apparatus as defined by claim 3, wherein said means for securing comprises a second piece of fabric, stretched over said rectangular frame, and detachably attached along at least one side thereof, so that a patient can be positioned between said pieces of fabric and supported on said rotatable stretcher during turning.

5. A turning apparatus as defined by claim 4, wherein said means for securing further comprises a plurality of straps, removably attached to at least one side of said frame, said straps constructed and arranged to provide additional support to a patient secured between said pieces of fabric during rotation.

6. A turning apparatus as defined by claim 3, wherein said fabric is removably secured to one side of said rectangular frame so as to allow easy access to the upwardly facing side of the patient's anatomy.

7. A turning apparatus as defined by claim 2, wherein said stretcher support comprises an outer frame, which forms a concentric rectangle about said rotatable stretcher, said rotatable stretcher being secured to said outer frame at opposite ends.

8. A turning apparatus as defined by claim 7, wherein said outer frame includes a plurality of telescoping members to accommodate the size of said frame to the operating room table, so as to enable said turning apparatus to be used in a wide variety of operating room situations.

9. A turning frame as defined by claim 7, wherein said outer frame is supported by a plurality of legs, each of said legs supported on a caster so as to make said turning apparatus portable.

10. A turning apparatus as defined by claim 9, wherein said outer frame further comprises a pair of stabilizing struts, secured to said legs.

11. A turning apparatus as defined by claim 9, wherein each of said caters is provided with a locking mechanism.

12. A turning apparatus as defined by claim 2, wherein said support comprises a pair of L-shaped stands, adapted to be situated at opposite ends of said operating room table, said stands being mounted on rollers for portability.

13. A turning apparatus for turning a patient from a supine to a prone position and vice-versa with minimal effort exerted by the person performing the turning and minimal risk of injury to the patient, said apparatus comprising:

- a rotatable stretcher for supporting a patient's body during a 180° rotation, said rotatable stretcher having spindles extending from opposite ends thereof, which provide a central axis of rotation in the plane of said rotatable stretcher about which said patient will be turned;
- a stretcher support for straddling an operating room table, said stretcher support having telescoping members, constructed and arranged to raise and lower said rotatable stretcher and a pair of hubs for receiving said spindles, so that said rotatable stretcher rotates about said central axis of rotation;
- a lock for locking said support at an elevated height; and
- means for turning said stretcher 180° about said central axis while said support is maintained at an elevated height.

14. A system for turning a patient from a supine to a prone position and vice versa with minimal effort exerted by the person performing the turning and minimal risk or injury to the patient, comprising the combination of:

- a patient support which can be raised and lowered to selectively elevate a patient upwardly or downwardly;
- a stretcher for supporting the patient during a rotation from a supine to a prone position and vice versa, said stretcher having a pair of spindles which provide a central axis of rotation in the plane of said rotatable stretcher;
- a stretcher support having a pair of hubs for receiving said spindles, wherein said stretcher support (i) rotatably mounts said stretcher over said bed patient support, (ii) is movable upwardly and downwardly as said bed patient support is raised and lowered, and (iii) can be locked in a predetermined position after being raised to an elevated position so that the stretcher bearing a patient will remain suspended after the bed patient support has been lowered; and
- an apparatus attached to said spindles of said stretcher for rotating said stretcher and patient from a supine to a prone position or vice-versa about said central axis while said support is in said locked position.

15. A method for turning a patient from a supine to a prone position and vice-versa while allowing easy access and ample room for a medical team, comprising the steps of:

- securing the patient to a turning apparatus which straddles a standard operating room table;
- raising the operating room table to elevate said patient and said turning apparatus;
- lowering said operating room table, leaving said turning apparatus in an elevated position;
- rotating said turning apparatus to thereby rotate said secured patient from a supine to a prone position or vice versa; and
- raising said operating table to the now-turned over patient's body until the patient's body is supported by said operating room table and lowering the patient to a suitable level where medical treatment can be resumed.

16. A method for turning a patient from a supine to a prone position and vice-versa while allowing easy access and ample room for a medical team, comprising the steps of:

- securing the patient to a turning apparatus which straddles a standard operating room table or hospital bed;
- raising the operating table or hospital bed to elevate said patient and said turning apparatus;
- locking said turning apparatus in said elevated position;
- lowering said operating room table or hospital bed, leaving said turning apparatus and patient elevated above said operating table or hospital bed;
- rotating said turning apparatus to thereby rotate said secured patient from a supine to a prone position or vice-versa above said operating table or hospital bed; and
- raising said operating table or hospital bed to the now-turned over patient until the patient's body is supported by said operating table or said hospital bed.

* * * * *